United States Patent [19]
Whitacre et al.

[11] Patent Number: 5,660,156
[45] Date of Patent: Aug. 26, 1997

[54] CAST PISTON HAVING REINFORCED COMBUSTION BOWL EDGE

[75] Inventors: John P. Whitacre, New Haven; Jeffrey L. Castleman, Monroeville, both of Ind.

[73] Assignee: Zollner Corporation, Fort Wayne, Ind.

[21] Appl. No.: 649,079

[22] Filed: May 16, 1996

[51] Int. Cl.$^6$ ............................................. F02F 3/26
[52] U.S. Cl. ............... 123/279; 29/888.044; 92/213; 123/193.6; 164/111; 164/112
[58] Field of Search ............... 123/193.6, 276, 123/279; 92/213; 29/888.042, 888.044; 164/111, 112

[56] References Cited

U.S. PATENT DOCUMENTS

| | | | |
|---|---|---|---|
| 1,296,591 | 3/1919 | Bamberg | 148/439 |
| 1,759,509 | 5/1930 | Jardine | 148/523 |
| 2,473,254 | 6/1949 | Morris | ........ |
| 2,685,729 | 8/1954 | Daub | 29/888.047 |
| 2,959,161 | 11/1960 | Bottger | 123/276 |
| 3,251,349 | 5/1966 | Isley | 123/193.6 |
| 3,369,465 | 2/1968 | Harrah | 92/218 |
| 4,120,081 | 10/1978 | Rösch et al. | 29/888.045 |
| 4,488,522 | 12/1984 | Jones | 123/193.6 X |
| 4,494,501 | 1/1985 | Ludovico | 123/193.4 |
| 4,658,706 | 4/1987 | Sander et al. | 92/213 |
| 4,662,326 | 5/1987 | Köhnert | 123/193.6 |
| 4,890,543 | 1/1990 | Kudou et al. | 92/228 |
| 4,971,003 | 11/1990 | Suzuki et al. | 123/279 |
| 5,425,306 | 6/1995 | Binford | 92/222 |
| 5,476,076 | 12/1995 | Zhou | 123/193.4 |
| 5,511,521 | 4/1996 | Bischofberger et al. | 123/193.6 |
| 5,560,334 | 10/1996 | Daxer et al. | 123/279 |

FOREIGN PATENT DOCUMENTS

| | | | |
|---|---|---|---|
| 1288819 | 12/1962 | France | 123/279 |
| 238420 | 8/1986 | Germany | 123/193.6 |

*Primary Examiner*—Tony M. Argenbright
*Attorney, Agent, or Firm*—Barnes & Thornburg

[57] ABSTRACT

A cast piston which includes a metal insert and a combustion bowl, with the metal insert defining a sharp undercut structure at an upper portion of the combustion bowl. The sharp undercut structure of the insert contains combustible gases and helps improve emissions. The metal insert also strengthens the head of the piston. The cast piston is fabricated by positioning the metal insert in a casting mold and casting a piston in the mold. The final shape of the combustion bowl is produced by a machining process which forms the sharp undercut structure on the insert.

23 Claims, 2 Drawing Sheets

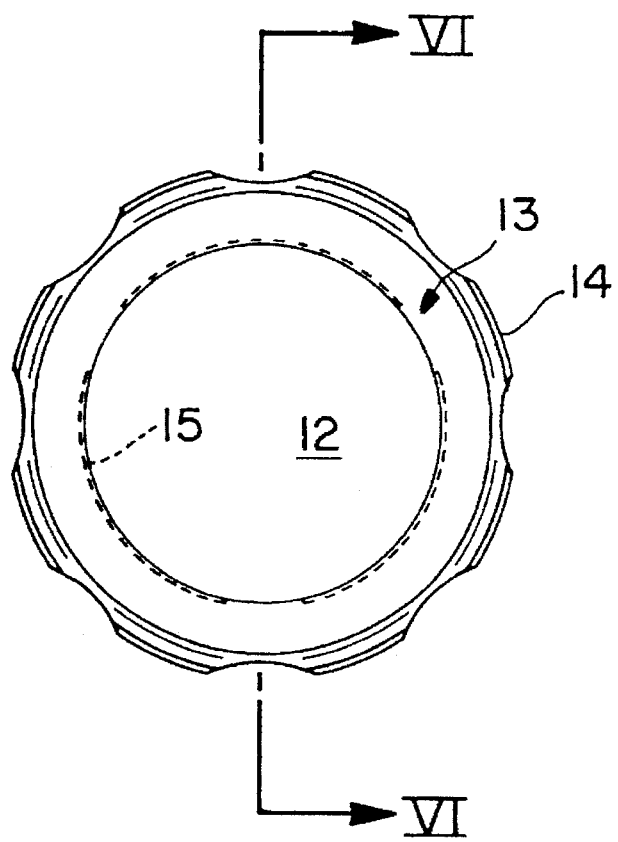
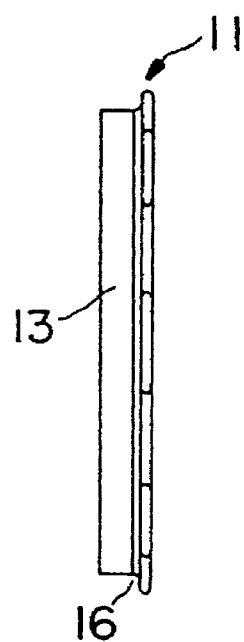
FIG. 4
FIG. 3
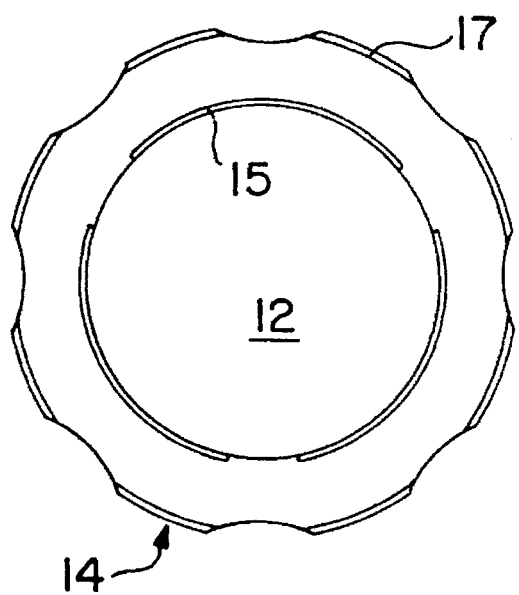
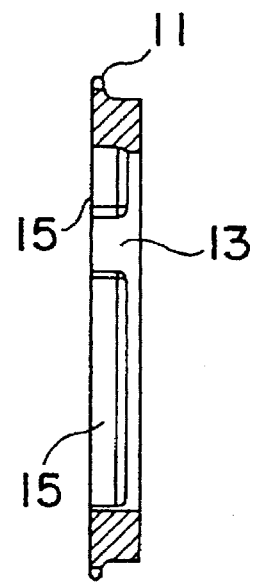
FIG. 5
FIG. 6

CAST PISTON HAVING REINFORCED COMBUSTION BOWL EDGE

TECHNICAL FIELD

The present invention relates to pistons for internal combustion engines. More particularly, the present invention is directed to cast aluminum pistons which include reinforced combustion bowl edges.

BACKGROUND ART

Pistons used in internal combustion engines, and particularly in medium range diesel engines, are generally of one of three designs: gravity cast aluminum pistons, squeeze-formed aluminum/metal matrix composite pistons, and two-piece steel crown/aluminum skirt articulated pistons. There are fairly well defined levels of specific power output which each of these design options can tolerate. Cost varies greatly between the three designs, with gravity cast pistons being the most economical to manufacture.

Pistons encounter extreme thermal conditions and mechanical forces which together subject certain portions of the pistons to stress that can lead to deterioration and failure. To date, efforts have been taken to reinforce and/or thermally insulate portions of cast pistons so that they are more durable and have a longer service life. Such efforts include the design of a variety of insert structures which provide thermal barriers and/or internal structural supports. Examples of insert structures used in cast pistons are found in U.S. Pat. No. 5,425,306 to Binford, U.S. Pat. No. 4,971,003 to Suzuki et al., U.S. Pat. No. 4,890,543 to Kudou et al., U.S. Pat. No. 4,662,326 to Kohnert, U.S. Pat. No. 4,658,706 to Sander et al., U.S. Pat. No. 4,494,501 to Ludovico, U.S. Pat. No. 4,120,081 to Rosch et al., U.S. Pat. No. 2,685,729 to Daub, U.S. Pat. No. 2,473,254 to Morris, and U.S. Pat. No. 1,759,509 to Jardine.

Despite improvements made to cast pistons, they are generally inefficient. Accordingly, the trend toward stricter emissions requirements is rapidly rendering the use of conventional gravity cast pistons inadequate.

DISCLOSURE OF THE INVENTION

It is accordingly one object of the present invention to provide a cast piston.

It is another object of the present invention to provide a cast piston having a reinforced combustion bowl edge.

Another object of the present invention is to provide a cast piston having a reinforced combustion bowl edge which includes an undercut structure that improves combustion.

A further object of the present invention is to provide a cast piston which includes an insert that defines an upper portion of a combustion bowl.

A further object of the present invention is to provide an insert for cast pistons which defines the upper portion of a combustion bowl in the pistons.

It is a further object of the present invention to provide a method of producing a cast piston having a reinforced combustion bowl edge.

An even further object of the present invention is to provide a method of casting a piston which includes an insert that defines the upper portion of a combustion bowl.

According to these and further objects of the present invention which will become apparent as the description thereof proceeds below, the present invention provides a cast piston which includes:

a piston head having a crown surface;

a piston skirt extending downwardly from the piston head;

a combustion bowl formed in the piston head, the combustion bowl having a side wall and extending downwardly from the crown surface; and a metal insert provided in the piston head at the crown surface, the metal insert defining an upper portion of the combustion bowl and providing the material strength to accommodate an undercut structure in the side wall of the combustion bowl.

The present invention further provides a method of fabricating a cast piston which comprises:

providing a piston mold;

positioning a metal insert in the piston mold;

casting a piston in the piston mold so that the insert is positioned at a crown surface of the cast piston; and machining a combustion bowl in a head of the cast piston so that the metal insert defines an upper portion of the combustion bowl which has an undercut structure.

The present invention also provides a metal insert for cast pistons which comprises:

a ring structure; and a flange provided at a lower portion of the ring structure and extending outwardly therefrom, the flange including a plurality of scallop-shaped protrusions.

BRIEF DESCRIPTION OF THE DRAWINGS

The present invention will be described hereafter with reference to the attached drawings which are given as non-limiting examples only, in which:

FIG. 3 is a top view of a piston insert according to one embodiment of the present invention.

FIG. 4 is a side view of the piston insert of FIG. 3.

FIG. 5 is a bottom view of the piston insert of FIG. 3.

FIG. 6 is a sectional view of the piston insert of FIG. 3, taken along line VI—VI.

BEST MODE FOR CARRYING OUT THE INVENTION

Figure 1:
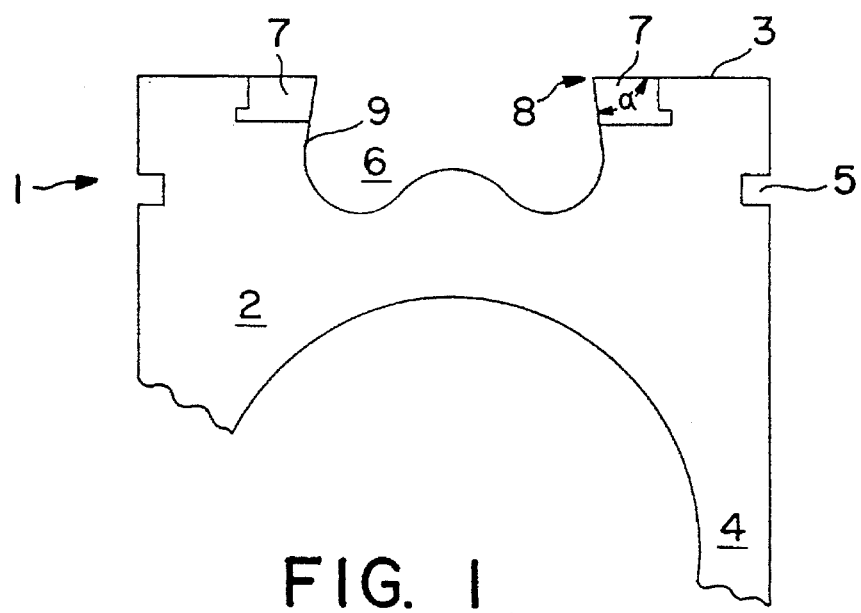
FIG. 1 is a longitudinal sectional view of the upper portion of a cast piston according to one embodiment of the present invention.

The present invention is directed to cast pistons for internal combustion engines. More particularly, the present invention is directed to cast aluminum pistons which can be made utilizing either a pressure casting process or, more preferably, a gravity casting process. The cast pistons of the present invention include a combustion bowl formed in the head thereof. An insert is provided around the upper rim of the combustion bowl at the crown of the piston. The insert defines the upper portion of the combustion bowl and reinforces the surrounding crown portion of the piston.

The insert used in the present invention is preferably made of a material which has similar thermal expansion characteristics as the material from which the crown of the piston is made. For example, the insert can be a sintered powder stainless steel insert when used in an aluminum cast piston.

The cast piston of the present invention is able to provide improved combustion characteristics. In this regard, the edge of the combustion bowl as defined by the insert can be undercut in a "re-entrant" fashion, i.e., in a manner which causes a combustible gaseous fuel to be contained in the combustion bowl before ignition thereof. This greatly improves combustion characteristics in a manner which heretofore was not achieved with good durability by simple cast pistons. During the course of the present invention, it was determined that the metallurgical characteristics of aluminum made it impractical to form a combustion bowl having an undercut structure, because such a structure would not withstand the forces encountered during repeated combustion cycles. The reason for this is because as the temperature of aluminum raises above 300° F. it looses strength rapidly, so that any unsupported or undercut structure made of aluminum is susceptible to failure at elevated temperatures.

The insert of the present invention was designed to improve the combustion efficiency of cast pistons and accommodate an undercut shape which can strengthen such pistons. In a preferred embodiment, the insert is designed to be positioned in a piston casting mold in which the piston is cast in a head-up manner. For this purpose, as discussed in detail below, the insert can be provided with structural features which can be used to grasp and position the insert into a casting mold.

The insert of the present invention is designed to be mechanically secured in a cast piston. For this purpose the insert is provided with structural elements which extend into the cast piston head and resist rotational forces and lifting forces. Such rotational and lifting forces are applied to the insert during a machining process. In this regard, a cast piston according to the present invention is made by positioning the insert in a piston casting mold, and filling the mold with molten aluminum so as to cast a piston having the insert located in the crown thereof. After casting the piston, the combustion bowl is formed or finished by a machining process in which an undercut structure is formed in the insert. It is the machining of the insert during the formation of the combustion bowl and the undercut structure which applies rotational and lifting forces to the embedded insert.

The cast pistons of the present invention can be used in a wide variety of internal combustion engines. However, the cast pistons of the present invention are particularly suited for use in medium range diesel engines, including engines used in over-the-road trucks, agricultural equipment, and similar applications.

The cast pistons of the present invention are economical, because the costs inherent to gravity cast pistons can be retained, while the performance characteristics of more costly piston types can be achieved.

FIG. 1 is a longitudinal sectional view of the upper portion of a cast piston according to one embodiment of the present invention. The piston, generally identified by reference numeral 1 includes a head 2 having a crown 3, and a piston skirt 4 extending from the head 2. The piston head 2 includes one or more grooves 5 which are of conventional design and provided to receive pistons rings (not shown). A combustion bowl 6 is formed in the piston head 2, which extends downwardly from the crown 3. Insert 7 is embedded in the piston head 2 at the crown 3 and surrounds combustion bowl 6. As shown, insert 7 defines an upper portion of the combustion bowl 6 with an undercut structure 8 at the crown surface of the piston 1 which is depicted in FIG. 1 as forming a sharp undercut edge.

The undercut structure 8, of the combustion bowl 6 which is defined by insert 7 is not drawn exactly to scale in FIG. 1. However, the undercut structure 8 is depicted as being formed so as to have an angle ("a" in FIG. 1) of less than 90° at the point where the inner surface 9 of the insert 7 intersects the piston crown 3. The side portions 10 of the combustion bowl 6 can be straight as depicted in FIG. 1, or curved so long as an undercut portion is provided at the upper edge of the combustion bowl 6. In a preferred embodiment, the inner surface 9 of the insert 7 intersects the upper surface of the piston crown 3 at an angle within the range of from about 45° to less than 90°, with an angle in the range of from about 60° to less than 90° being more preferred and an angle of from about 75° to less than about 85° being most preferred.

Under ideal conditions, the combustion of fuel gases should take place within the combustion bowl 6. If the undercut structure 8 defines an upper edge of the combustion bowl as depicted in FIG. 1 having an angle of 90° or greater, or if the undercut structure defines a rounded edge, fuel (which is sprayed into the combustion bowl by an injector mounted above the piston) will be allowed to escape from the combustion bowl 6 onto the piston crown 3 or into the clearance space between the crown 3 and cylinder wall, producing unwanted emissions Maintaining a sharp edge around the combustion bowl 6, having an angle of less than 90°, assists in containing fuel gases in the combustion bowl 6 and thus, controlling emissions. As depicted in FIG. 1, the insert 7 includes a flange structure 11 which extends outwardly from a lower portion thereof. This flange 11 includes means for preventing rotation and lifting of the insert 7 during machining thereof. Flange 11 also can be used to properly align the insert 7 in a piston casting mold, as discussed herebelow.

Figure 2A:
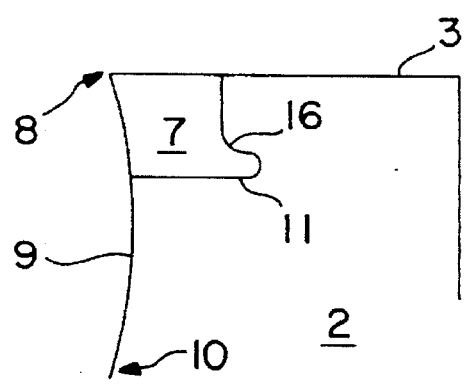
FIG. 2a is an enlarged longitudinal sectional view of the undercut structure of the insert according to one embodiment of the present invention.

FIG. 2a is an enlarged longitudinal sectional view of the undercut structure 8 of the insert 7 according to one embodiment of the present invention. As shown in FIG. 2a, the undercut structure 8 has a sharp or pointed edge structure which encircles the rim of the combustion bowl 6 and projects toward the center of opening 12. FIG. 2a further depicts the side portions 10 of the inner surface 9 of combustion bowl 6 as having a curved shape.

Figure 2B:
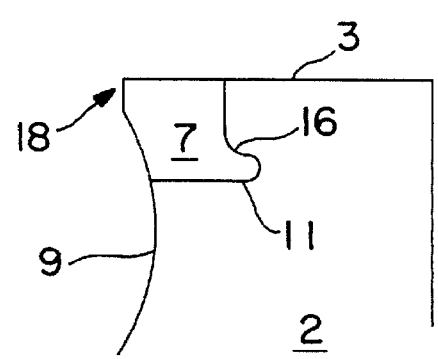
FIG. 2b is an enlarged longitudinal sectional view of the undercut structure of the insert according to another embodiment of the present invention.

FIG. 2b is an enlarged longitudinal sectional view of the undercut structure 8 of the insert 7 according to another embodiment of the present invention. In FIG. 2b the undercut structure 8 is not provided at the crown 3 of the piston 1 as in the case of the undercut structure 8 shown in FIGS. 1 and 2a. Instead, the undercut structure 8 in FIG. 2b does not intersect the crown 3 of the piston. That is, the undercut structure 8 is spaced apart from the crown surface of the piston. In this embodiment, there is a neck portion 18 between the crown surface of the piston and the undercut structure 8. This neck portion 18 is depicted in FIG. 2b as being normal to the crown surface of the piston. However, the exact shape of the neck portion 18 can be varied so as to angled, curved, or have a compound shape, as desired.

The undercut structure 8 in the embodiments illustrated in FIGS. 2a and 2b and similar modifications within the scope of the present invention function in a similar manner to contain combustible gaseous fuels in the combustion bowl prior to ignition thereof. Accordingly, it can be appreciated that the exact shape of the undercut structure 8 is not limited to that shown in these figures.

FIG. 3 is a top view of a piston insert 7 according to one embodiment of the present invention. As seen in FIG. 3, the insert 7 is generally a ring-shaped or annular structure, having a substantially circular opening 12 therethrough. The flange 11 extends radially outward from a main annular ring structure 13 and includes a number of scallops 14 which can be symmetrically spaced about the insert 7 as shown. The scallops 14 preferably are defined by curved cutouts formed in flange 11 as shown. However, rectangular cutouts, defining rectangular arm structures could also be used. Alternatively, other cutout shapes such as triangular, trapezoidal, or other curved shapes could be used to produce complementary shaped extensions on flange 11.

As shown in FIG. 3, the insert 7 is provided with several notches 15 which are located in the bottom surface thereof. These illustrated notches 15, or a different arrangement of similar notches, can be used to grasp the insert 7 from the top with a tool that can be inserted through opening 12 and manipulated to engage notches 15. The notches 15 thus can be used to position the insert 7 into a piston casting mold with a manually operated tool or with an automated handler. Providing the notches 15 in the lower surface of the insert 7 facilitates positioning of the insert 7 in a casting mold used in a head-up casting process. Alternatively, such notches could be provided in the upper surface of the insert 7 and used to position the insert 7 in a casting mold which casts a piston in a head-down casting process.

FIG. 4 is a side view of the piston insert of FIG. 3. As shown in FIG. 4, flange 11 extends outwardly from a lower portion of main ring structure 11. A transition structure 16 can be provided between the flange 11 and the main ring structure 13. The transition structure 16 strengthens the connection between the flange 11 and main ring structure 13. Preferably, the insert 7 is formed by a sintering process such as powder metallurgy, which produces an integral structure.

FIG. 5 is a bottom view of the piston insert of FIG. 3. FIG. 5 depicts the notches 15 which are provided in the bottom surface of the insert 7 at the periphery of opening 12. FIG. 5 also depicts the scallops 14 as having bevelled or preferably curved outer edges 17. This bevelled or preferred curved structure is provided on both the upper and lower surfaces of the scallops 14 as seen in FIG. 3.

FIG. 6 is a sectional view of the piston insert of FIG. 3, taken along line VI—VI. FIG. 6 depicts the transitional structure 16 and curved shape of the outer edges of scallops 14. FIG. 6 also shows the notches 15 on the lower surface of the insert 7.

The embodiment of the insert 7 shown in FIGS. 3–6 depicts the insert 7 in its unmachined state. That is, the insert 7 depicted in FIGS. 3–6 is embedded into a cast piston during a casting process and subsequently machined during a machining process which forms combustion bowl 6. Accordingly, the notches 15 shown in FIGS. 3–6 are eliminated during the machining process so that the insert has the final shape as depicted in FIG. 1. The flange 11 mechanically bonds the insert 7 in the piston head 2 as a result of the casting process. The curved features of the flange 11, including the smooth shape of the scallops 14, the edges 17 thereof, and the transition structure 16, ensure that molten metal, such as aluminum, fully encompasses and surrounds the insert 7 during a casting process so that there are substantially no gaps between the insert and the piston head. The use of an insert 7 made from a material which has thermal expansion characteristics similar to those of the material from which the piston is cast further prevents the formation of gaps or cracks at the interface between the piston head and the embedded insert. According to one preferred embodiment of the present invention a stainless steel insert was included in a cast aluminum piston and found to resist cracking at the aluminum/stainless steel interface.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. A gravity cast piston which comprises:

a piston head having a crown surface;

a piston skirt extending downwardly from said piston head;

a combustion bowl formed in said piston head, said combustion bowl having a side wall and extending downwardly from said crown surface; and a metal insert provided in said piston head at the crown and defining an upper portion of said combustion bowl, said insert having an annular ring structure with a smooth outer wall and a flange which extends outwardly from a lower portion of the annular ring structure, said flange including a row of scallop-shaped protrusions along an outer peripheral edge thereof, said metal insert providing an undercut structure in said side wall.

2. A gravity cast piston according to claim 1, wherein said undercut structure comprises an undercut edge which intersects said crown surface.

3. A gravity cast piston according to claim 2, wherein said undercut structure has an angle defined at the intersection of said crown surface and an inner surface of said combustion bowl which is less than 90°.

4. A gravity cast piston according to claim 3, wherein said undercut structure has an angle of from about 60° to less than 90°.

5. A gravity cast piston according to claim 2, wherein said undercut structure comprises a sharp edge.

6. A gravity cast piston according to claim 2, wherein said combustion bowl has curved upper side walls.

7. A gravity cast piston according to claim 1, wherein said cast piston and said metal insert are made from metals which have substantially similar thermal expansion characteristics.

8. A gravity cast piston according to claim 7, wherein said piston is made of aluminum and said insert is made from stainless steel.

9. A gravity cast piston according to claim 1, wherein the row of scallop-shaped protrusions consists of a single row of scallop-shaped protrusions.

10. A method of fabricating a gravity cast piston which comprises:

providing a piston mold;

positioning a metal insert in said piston mold;

gravity casting a piston in said piston mold so that said insert is positioned at a crown surface of said cast piston; and machining a combustion bowl in a head of said cast piston so that said metal insert defines an upper portion of said combustion bowl and provides an undercut structure in a side wall of said combustion bowl.

11. A method according to claim 10, wherein said undercut structure comprises an undercut edge which intersects said crown surface.

12. A method according to claim 11, wherein said undercut structure has an angle defined at the intersection of said crown surface and an inner surface of said combustion bowl which is less than 90°.

13. A method according to claim 12, wherein said undercut structure has an angle of from about 60° to less than 90°.

14. A method according to claim 11, wherein said undercut structure comprises a sharp edge.

15. A method according to claim 10, wherein said piston is cast in a head-up casting process.

16. A method according to claim 10, wherein said insert includes notches for gripping which are machined away during said machining step.

17. A method according to claim 11, wherein said combustion bowl has curved upper side walls.

18. A method according to claim 10, wherein said cast piston and said metal insert are made from metals which have substantially similar thermal expansion characteristics.

19. A method according to claim 18, wherein said piston is made of aluminum and said insert is made from stainless steel.

20. A metal insert for gravity cast pistons which comprises:

a ring structure having a smooth outer wall; and a flange provided at a lower portion of said ring structure and extending outwardly therefrom, said flange including a row of scallop-shaped protrusions along an outer peripheral edge thereof.

21. A metal insert according to claim 20, wherein said insert includes a central through bore and further comprises means for gripping said insert, said means for gripping comprising at least one notch formed adjacent said through bore.

22. A metal insert according to claim 20, wherein said scallop-shaped protrusions have curved edges.

23. A metal insert according to claim 20, wherein the row of scallop-shaped protrusions consists of a single row of scallop-shaped protrusions.

* * * * *